United States Patent
Svennung et al.

(10) Patent No.: US 9,138,846 B2
(45) Date of Patent: Sep. 22, 2015

(54) BATTERY-POWERED PORTABLE TOOLS

(71) Applicant: Husqvarna AB, Huskvarna (SE)

(72) Inventors: Johan Svennung, Jönköping (SE); Pär Martinsson, Jönköping (SE); Johan Björnlinger, Huskvarna (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 14/455,275

(22) Filed: Aug. 8, 2014

(65) Prior Publication Data

US 2015/0027742 A1 Jan. 29, 2015

Related U.S. Application Data

(63) Continuation of application No. 13/263,455, filed as application No. PCT/EP2009/002588 on Apr. 8, 2009, now Pat. No. 8,833,485.

(51) Int. Cl.

| | |
|---|---|
| *B25F 5/00* | (2006.01) |
| *B23Q 11/00* | (2006.01) |
| *H01H 9/06* | (2006.01) |
| *F16P 3/20* | (2006.01) |
| *A01G 3/053* | (2006.01) |
| *B23B 45/02* | (2006.01) |

(Continued)

(52) U.S. Cl.
CPC ............ *B23Q 11/0078* (2013.01); *A01G 3/053* (2013.01); *B23B 45/02* (2013.01); *B25F 5/00* (2013.01); *B27B 17/08* (2013.01); *F16P 3/00* (2013.01); *F16P 3/20* (2013.01); *H01H 9/06* (2013.01); *B23B 2260/122* (2013.01); *B23B 2270/022* (2013.01); *Y10T 408/21* (2015.01)

(58) Field of Classification Search
CPC .............. B25F 5/00; B25F 5/001; B25F 5/02; F16P 5/00; A01G 3/053; H01H 3/20; H01H 9/06
USPC ............ 173/2, 20, 21, 176, 171, 217; 30/381, 30/382, 383; 200/43.17, 322; 318/432, 318/599, 811; 388/800, 937; 73/862.23

See application file for complete search history.

(56) References Cited

U.S. PATENT DOCUMENTS

| | | | | |
|---|---|---|---|---|
| 4,432,139 | A | * | 2/1984 | Kohler et al. .................... 30/381 |
| 4,546,723 | A | * | 10/1985 | Leopold et al. ................ 118/669 |
| 4,689,534 | A | * | 8/1987 | Gerber et al. .................. 388/809 |

(Continued)

*Primary Examiner* — Scott A. Smith
(74) *Attorney, Agent, or Firm* — Nelson Mullins Riley & Scarborough LLP

(57) ABSTRACT

A battery-powered tool includes: a housing, a driven element supported by the housing, an electric motor coupled to the driven element so as to drive the driven element, a battery electrically coupled to the motor so as to supply electric current to the motor and a control circuit arranged to control the supply of electric current to the motor from the battery. The control circuit includes a main switch operable by a user and an auxiliary switch also operable by a user. The control circuit has an active state in which operation of the main switch by the user allows electric current to flow to the motor to cause the driven element to be driven; and an inactive state in which operation of the main switch does not allow electric current to flow to the motor and so the motor does not drive the driven element. Operation of the auxiliary switch causes the control circuit to change between the active and inactive states.

8 Claims, 4 Drawing Sheets

(51) Int. Cl.
  *B27B 17/08* (2006.01)
  *F16P 3/00* (2006.01)

(56) References Cited

U.S. PATENT DOCUMENTS

| | | | | |
|---|---|---|---|---|
| 5,115,175 A | * | 5/1992 | Fletcher | 318/280 |
| 5,150,523 A | * | 9/1992 | McCurry | 30/228 |
| 5,440,215 A | * | 8/1995 | Gilmore | 318/432 |
| 5,685,080 A | * | 11/1997 | Amano et al. | 30/383 |
| 5,724,737 A | * | 3/1998 | Stones | 30/228 |
| 5,791,057 A | * | 8/1998 | Nakamura et al. | 30/381 |
| 5,969,312 A | * | 10/1999 | Svetlik et al. | 200/61.85 |
| 6,548,776 B1 | * | 4/2003 | Jong | 200/334 |
| 6,878,888 B1 | * | 4/2005 | Jong | 200/43.17 |
| 7,093,668 B2 | * | 8/2006 | Gass et al. | 173/2 |
| 7,174,973 B1 | * | 2/2007 | Lysaght | 173/217 |
| 7,178,248 B2 | * | 2/2007 | Richards | 30/520 |
| 7,497,272 B2 | * | 3/2009 | Strasser et al. | 173/48 |
| 7,936,142 B2 | * | 5/2011 | Otsuka et al. | 318/599 |
| 8,833,485 B2 | * | 9/2014 | Svennung et al. | 173/20 |

* cited by examiner

BATTERY-POWERED PORTABLE TOOLS

CROSS REFERENCE TO RELATED APPLICATIONS

This application is a continuation of U.S. application Ser. No. 13/263,455 filed Oct. 7, 2011; now U.S. Pat. No. 8,833,485, which is a national phase entry of PCT/EP2009/002588 filed Apr. 8, 2009, the contents of each of which are incorporated herein in their entireties.

This invention relates to battery-powered portable tools, such as chainsaws, hedge trimmers, drills and the like.

Battery-powered portable tools, such as handheld drills, chainsaws, hedge trimmers and so on, generally comprise a housing supporting a battery, a motor and a driven element, such as a blade or a chuck holding a drill bit. The battery powers the motor, which in turns drives the driven element.

It is desirable to attempt to ensure that the tool activates only when desired; otherwise, a user could be surprised by an inadvertent activation of the tool, particularly if that user is inexperienced in the use of such tools. With petrol- or gasoline-powered portable tools, it is obvious when such tools are potentially active, as the engine that powers those tools makes noise when idle. A battery-powered tool, on the other hand, makes no noise when idle.

According to a first aspect of the invention, there is provided a battery-powered portable tool, comprising: a housing, a driven element supported by the housing, an electric motor coupled to the driven element so as to drive the driven element, a battery electrically coupled to the motor so as to supply electric current to the motor and a control circuit arranged to control the supply of electric current to the motor from the battery, in which the control circuit comprises a main switch operable by a user and an auxiliary switch also operable by a user; in which the control circuit has: an active state in which operation of the main switch by the user allows electric current to flow to the motor so as to cause the driven element to be driven; and an inactive state in which operation of the main switch does not allow electric current to flow to the motor and so the motor does not drive the driven element; in which operation of the auxiliary switch causes the control circuit to change between the active and inactive states; and in which the control circuit is further provided with indication means arranged to provide an indication to a user whether the control circuit is in the active or inactive mode.

Thus, a user can determine with ease whether the tool is active; a user therefore is less likely to be surprised by the driven element being driven should the main switch be inadvertently activated than if there were no activation.

The control circuit may comprise a plurality of auxiliary switches, each of which is capable of putting the control circuit into the inactive state. Each of the auxiliary switches may be arranged to determine whether the tool is an appropriate state to be used. An indication may be provided whether each of the auxiliary switches is placing the control circuit in the inactive position.

At least one of the, or each, auxiliary switches may comprise a timer arranged to determine if the main switch has not been activated for a predetermined period of time and to cause the control circuit to enter the inactive mode if it is so determined. The indication means may be arranged to indicate if the control circuit has been placed in the inactive state because of the time elapsed since last activation of the main switch.

In some examples, where the tool is a chainsaw provided with a chain brake, an auxiliary switch may be provided coupled to the chain brake, such that activation of the chain brake causes the auxiliary switch to put the control circuit into the inactive state. Alternatively or additionally, the tool may be a cutting tool, such as a chainsaw or hedge trimmer having a hook from which the tool can be suspended, the hook being pivotally mounted on the housing; in such a case, if the hook is positioned such that the tool can be suspended from the hook, the auxiliary switch will place the control circuit in the inactive state.

The indication means can provide an indication should the main switch be activated in the inactive state. This provides a use with feedback on why the device is not operating when the user tries to operate it.

The indication means may comprise at least one light emitting device, and the control circuit may be arranged to illuminate at least one of the or each light emitting devices in order to provide the indication. Where there is a plurality of auxiliary switches, a light emitting device may be provided for each auxiliary switch, so as to indicate whether each auxiliary switch is causing the control circuit to be in the inactive or active states.

The indication means may comprise a speaker, with the control circuit being arranged to provide the indication by causing the speaker to emit sound. Sound may be emitted whenever the control circuit is in the active state. Accordingly, this will provide a user familiar with petrol- or gasoline-powered tools the same feedback with the present battery-powered tool. Those users familiar with the operation of battery-powered tools may simply ignore the sound.

The control circuit may be provided with a memory for the sound emitted. The sound emitted may be changed, typically by a user, for example by storing a different sound in the memory or by selecting a different one of a plurality of sounds stored in the memory. This enables a user of the tool to change the sound emitted as part of the indicated dependent upon their personal preferences. For example, the sound could be a verbal announcement of the state of the control circuit, and the selection may be between different language version of the verbal announcement (English, Swedish, German, etc).

The control circuit may be provided with an interface, by means of which sounds can be uploaded to the memory. This allows a user to customise their tool by changing the sound emitted; for example, the user may be able to upload music, simulation of different tools (such as petrol- or gasoline-powered tools) or engines (such as automobile engines).

The tool may be a chainsaw or a hedge trimmer.

There now follows, by way of example only, embodiments of the invention, described with reference to the accompanying drawings, in which.

Figure 1:
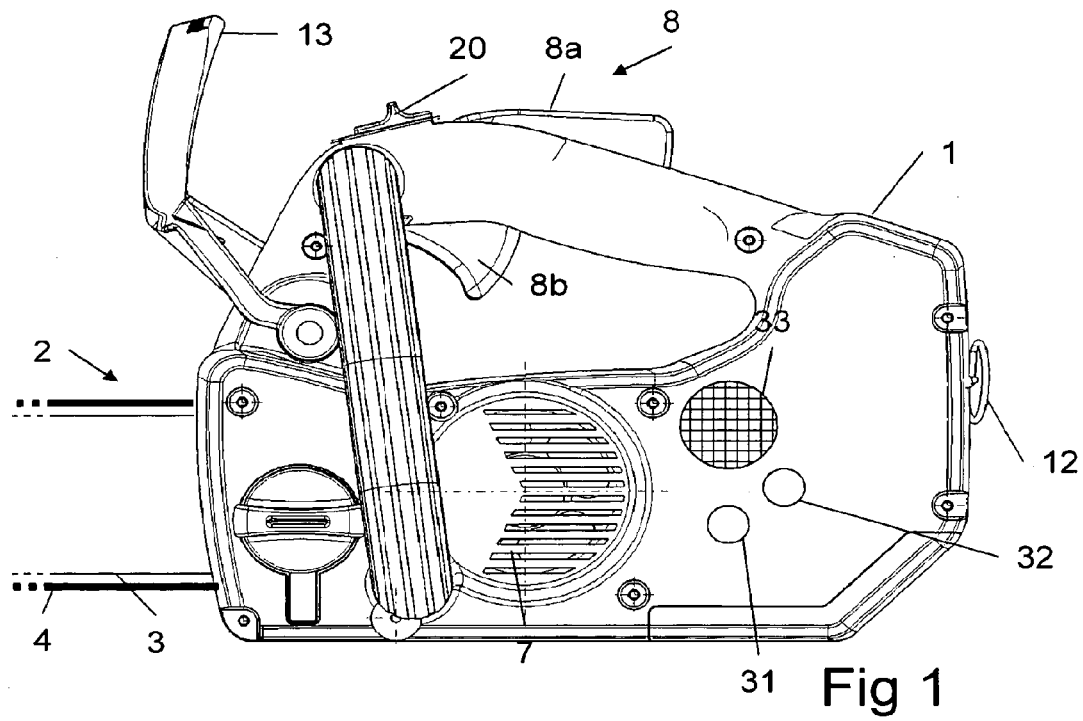
FIG. 1 shows a side elevation of a chainsaw according to a first embodiment of the invention, in the active state.

A chainsaw according to an embodiment of the invention IS shown in the accompanying drawings. It comprises a housing 1 supporting a driven cutting element 2 (shown only in FIG. 1). The cutting element comprises an elongate support 3 over which an endless loop of cutting chain 4 runs. The cutting chain has cutting elements on each link.

Figure 5:
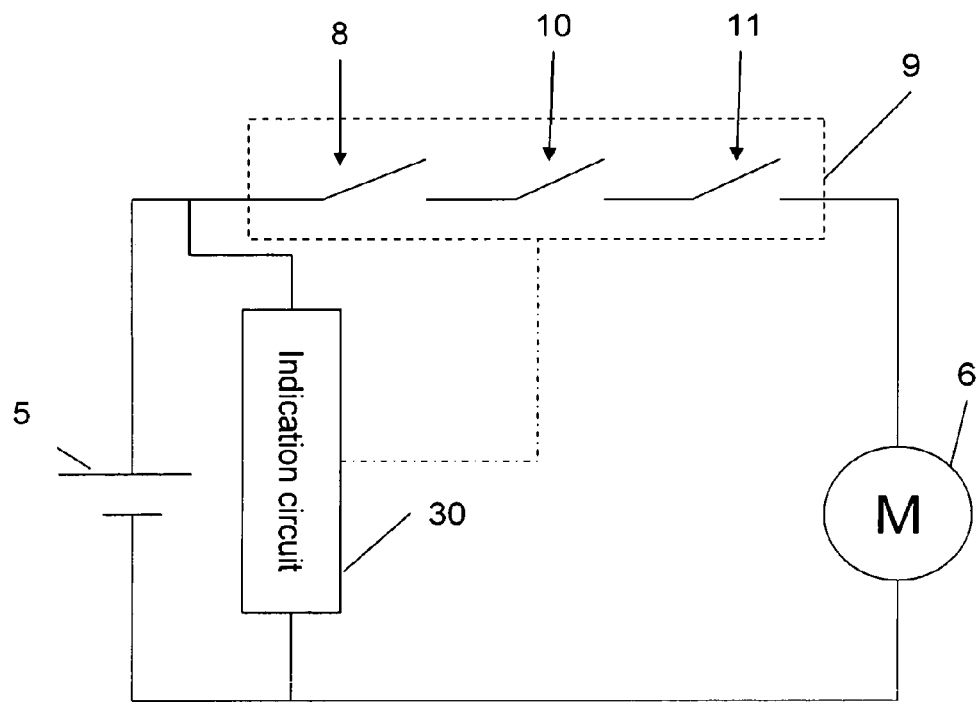
FIG. 5 shows a circuit diagram of the electric circuit controlling the chainsaw of FIG. 1.
Figure 6:
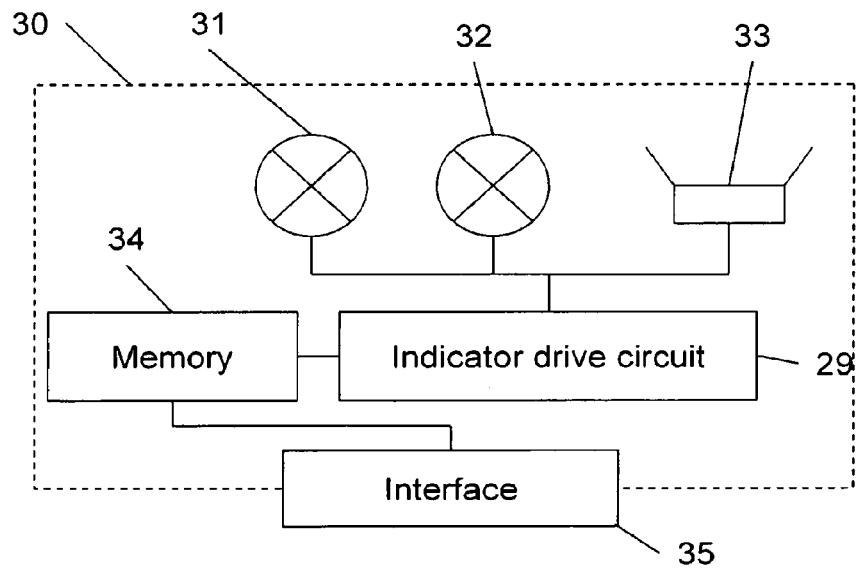
FIG. 6 shows the indication circuit of FIG. 5 in more detail.

In order to drive the cutting chain 4, a battery 5 and a motor 6 (both shown in FIG. 5) are provided in the housing. The motor 6 acts to rotate a drive wheel 7 and so drive the chain 4 around the support 3 when current is supplied to it by the battery 5.

The main control a user has over the operation of the chainsaw is by the use of the main switch 8. The user must squeeze both parts 8a, 8b of the main switch in order to allow current to flow from the battery 5 to the motor 6 and so drive the cutting chain 3 to cut.

The chainsaw is also provided with a chain brake, which acts to physically brake the rotation of the drive wheel 7. This is activated by the user pushing forwards (that is, towards the blade, and to the left in the Figures) a chain brake handle 13. This is useful if the user wishes to stop the chainsaw, quickly.

However, in order to prevent inadvertent activation of the chainsaw, the chainsaw is provided with a control circuit 9, which controls the passage of current from the battery 5 to the motor 6. This is shown in more detail in FIG. 5 of the accompanying drawings. The control circuit 9 comprises three switches in series; accordingly, in order for current to flow from the battery 5 to the motor 6 all three switches must be closed.

The first switch in the series is the main switch 8; this functions as discussed above, with the user squeezing the two parts 8a, 8b in order to activate the chainsaw and so cause the chainsaw to cut.

The remaining two switches 10, 11 are first and second auxiliary switches respectively. If either of these two switches are open, then the control circuit 9 is in an inactive state; activate of the main switch 8 will not cause the chain saw to cut. However, if both of the auxiliary switches 10, 11 are closed, then the control circuit 9 is in an active state, and the main switch will function to operate the chainsaw.

Figure 2:
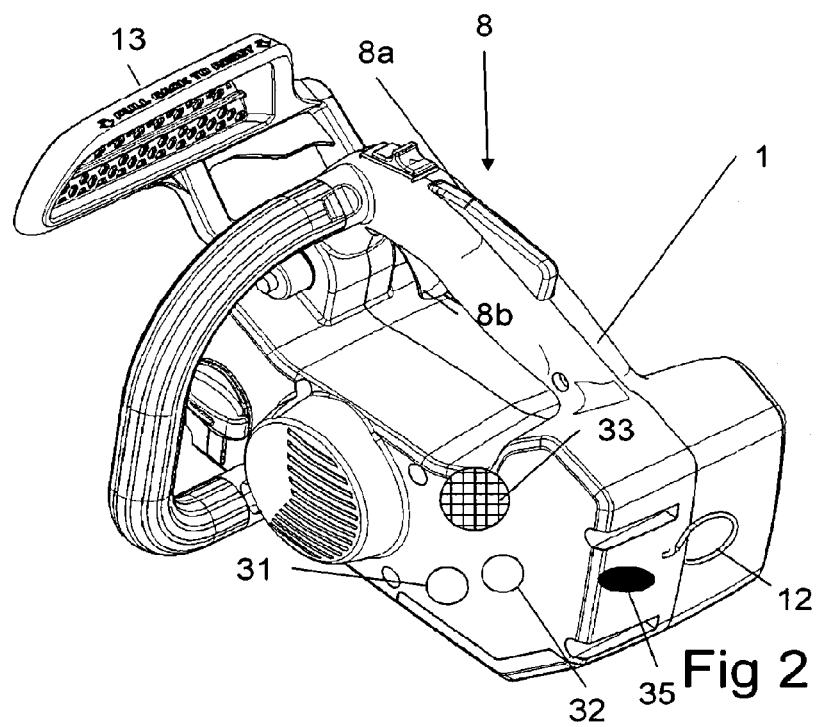
FIG. 2 shows a perspective view of the chainsaw of FIG. 1.

The first auxiliary switch 10 comprises a hook 12 pivotally mounted on the rear (that is, the end opposite the cutting element 2) of the housing 1. The hook 12 therefore has two positions: a folded-in position, shown in FIGS. 1 and 2 of the accompanying drawings, in which the hook 12 lies against the housing, and a protruding position, shown in FIGS. 3 and 4 of the accompanying drawings, in which the hook 12 protrudes normal to the housing. In the protruding position, the hook 12 can be used to suspend the chainsaw, typically so it can be hoisted up a tree that is being sawn.

Figure 3:
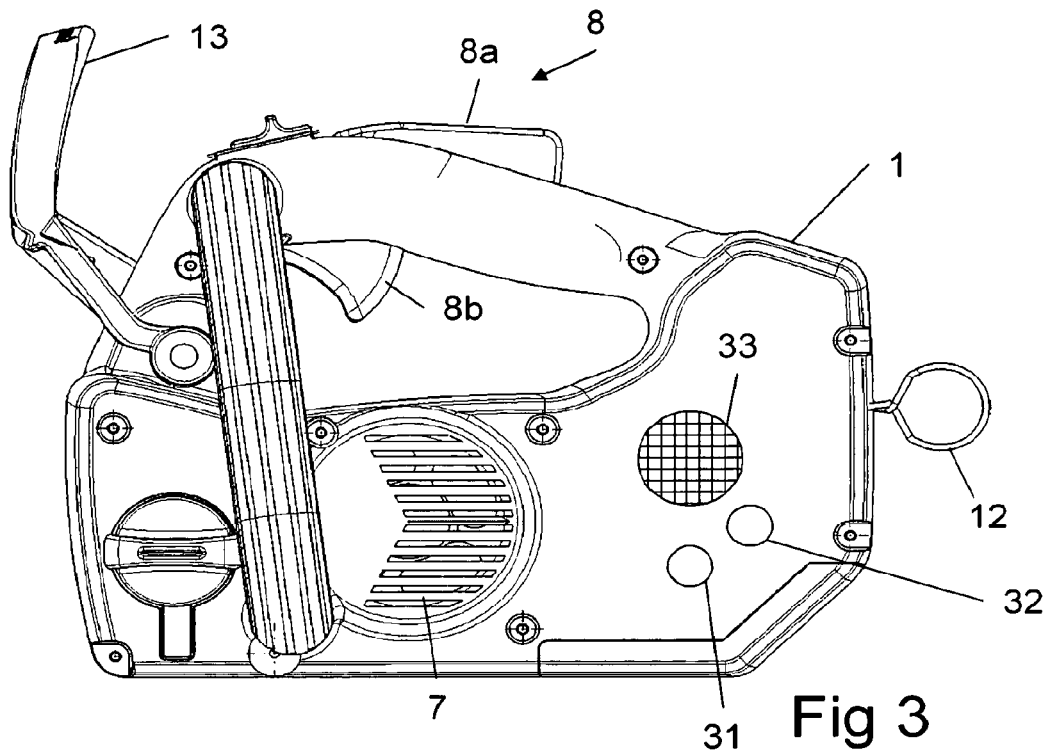
FIG. 3 shows a side elevation of the chainsaw of FIG. 1, in an inactive state.
Figure 4:
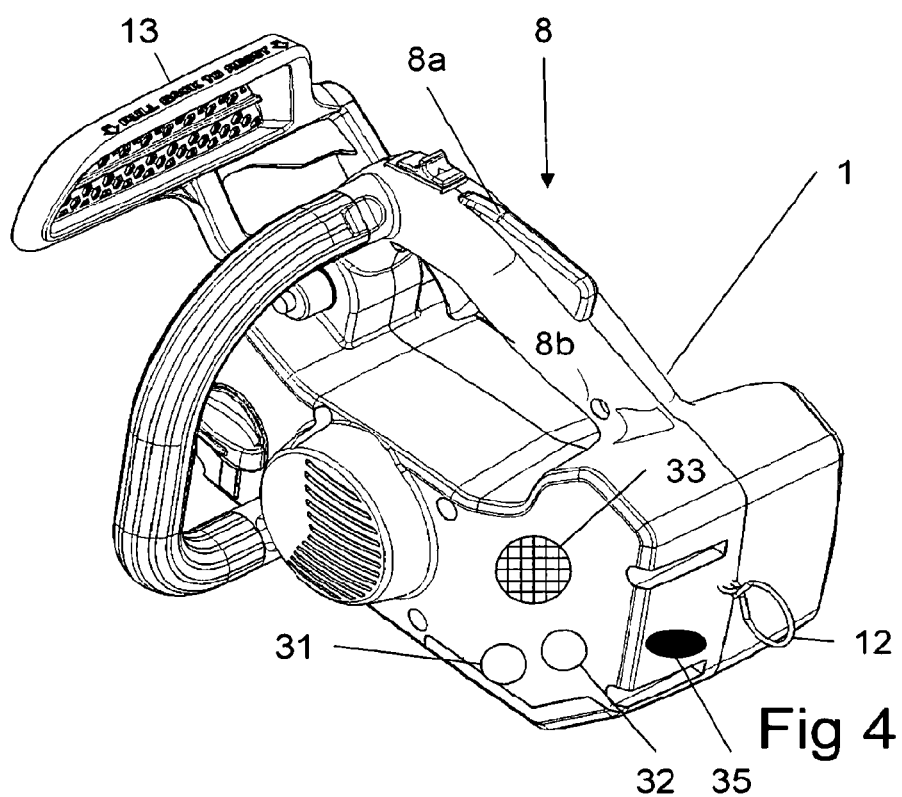
FIG. 4 shows a perspective view of the chainsaw of FIG. 1, in the inactive state.

As it is undesirable that the chainsaw operates whilst being suspended from the hook 12, the first auxiliary switch 10 is electrically open when the hook 12 is in the protruding position of FIGS. 3 and 4 of the accompanying drawings. The first auxiliary switch 10 is electrically closed by moving the hook 12 into the folded-in position of FIGS. 1 and 2 of the accompanying drawings. Thus, the control circuit 9 will be in the inactive state if the hook 12 is in the protruding position and so could be used to suspend the chainsaw, whereas the control circuit 9 could be in the active state with the hook 12 in the folded-in position. Thus, it is difficult if not impossible for the chainsaw to be activated with the chainsaw suspended from the hook 12.

The second auxiliary switch 11 is coupled to the chain brake handle 13. On activation of the chain brake by the chain brake handle, the second auxiliary switch 11 will open, putting the control circuit 9 into the inactive state. This is useful, as if the chain brake handle 13 has been activated (pushed away from the user, towards the cutting element 2), then it must be desired to stop the cutting element 2. Similarly, the second auxiliary switch 11 will close if the chain brake handle is reset, allowing the control circuit 9 to return to the active state (dependent upon the state of the first auxiliary switch).

Thus, by providing an auxiliary switch coupled to the chain brake handle, the motor can be stopped at the same time that the chain brake is being used to stop the chain, which may lead to quicker stopping of the chain. Furthermore, if the chain brake is applied a user is unlikely to desire to activate the motor against the brake, and so the inactive state is appropriate, as it will prevent any inadvertent activation of the motor against the brake, which could lead to overheating of the motor.

In addition, a power switch 20 can be provided, which can cut all power from the chainsaw.

In order to inform a user which state in the control circuit 8 is, an indication circuit 30 is provided. This is coupled to the control circuit 8 so as to determine the state of each of the auxiliary switches 10, 11. The indicator circuit provides both visible and audible feedback to the user as will be explained below, driven by indicator drive circuit 29.

Each of the auxiliary switches 10, 11 is provided with an associated light emitting diode (LED) 31, 32. The indicator drive circuit 29 determines whether each of the auxiliary switches is open or closed, and then lights the LEOs accordingly. The indication to the user can potentially be provided to the user in two ways; firstly, the LEDs could be illuminated if the switches are closed (to show normal operation) or if the switches are open (to show abnormal operation). Alternatively, each LED could be a two-colour LED, and be constantly illuminated but change colour to indicate whether the respective switch is open or closed; for example red could indicate that the switch is open and therefore an abnormal situation exists with respect to that switch, whereas green could indicate that the switch is closed and so that auxiliary switch is in a position where the chainsaw can be used.

Because a LED is provided for each auxiliary switch, the user can determine not only if the control circuit is in the active or inactive state but any reason (the position of the hook or the application of the chain brake) why the chainsaw might be inactive.

In addition, the indication circuit 30 is provided with a loudspeaker 33, which can be driven by the indicator drive circuit. This can function in several ways. Firstly, whenever the control circuit is in the active position, it can emit a predetermined sound. This is stored digitally in a memory 34 in the indicator circuit 30, and converted to appropriate analogue drive signals for the speaker by the indicator drive circuit 29. For example, the sound could be music (classic or popular), the sound of an automobile, the sound of a petrol- or gasoline-powered chainsaw engine or any other sound that can be stored in the memory. This sound is emitted constantly or intermittently whenever the control circuit 8 is in the active mode. Accordingly, the user is warned whenever the chainsaw is active that the main switch 8 can act to activate the chainsaw.

Alternatively or in addition, the indicator circuit 29 can cause the loudspeaker 33 to emit a sound whenever the control circuit or the auxiliary switches change state. For example, whenever the control circuit becomes active, the loudspeaker 33 may emit a verbal announcement "chainsaw active". Whenever the control circuit become inactive, the loudspeaker may announce "chainsaw inactive" then a reason—"hook pulled out" or "chain brake applied". In a yet further alternative or additional feature, the indicator circuit can provide an indication, be it visual (for example, flashing one of the LEDs) or audible (for example, another sound) should the main switch be activated in the inactive state.

The indication circuit may also comprise an interface 35 by means of which different sounds can be uploaded to the memory 34. This allows a user to change the sounds their chainsaw produces. The interface may be a standard interface, such as USB or an Ethernet network connection, or may be wireless, such as WiFi or Bluetooth. Alternatively, the user may have to return the chainsaw to a dealer in order to update the sounds stored. Replacement or additional sounds could include user-selected music, announcements in different languages, the sounds of other engines or whatever the user desired.

Figure 7:
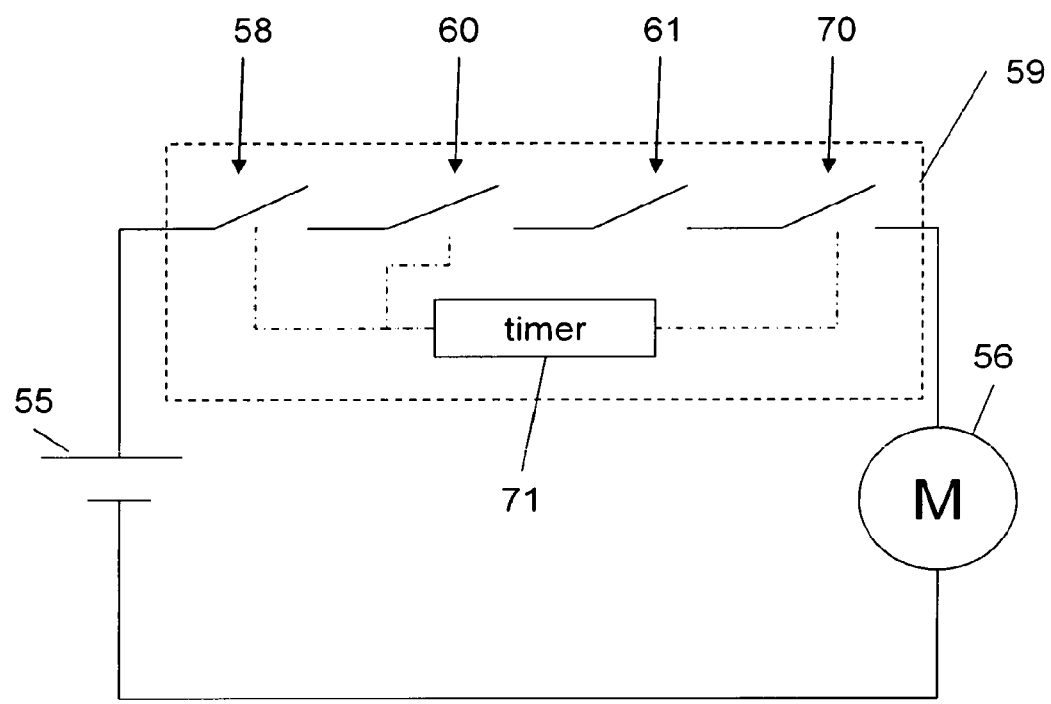
FIG. 7 shows an alternative embodiment of the circuit of FIG. 5.

In a further embodiment extending the present embodiment, the control circuit has been extended as shown in FIG. 7 of the accompanying drawings. Equivalent reference numerals to the first embodiment are used, raised by 50.

In this embodiment, the functioning of the chainsaw is largely as described above. The control circuit 59 comprises a main switch 58 and first and second auxiliary switches 60 and 61. However, a third auxiliary switch 70 is provided, together with a timing circuit 71. The timing circuit is coupled to the main switch 58; if the main switch is not activated within a predetermined period (say anything from 30 seconds to 5 minutes), then the timing circuit will open the third auxiliary switch 70, thus placing the control circuit 59 in the inactive state.

This is useful in making a chain saw that has not been used for a period of time dormant. A user is therefore less likely to be surprised should they inadvertently operate the main switch 58.

In order to provide for reactivating the chainsaw, the timing circuit 71 is also coupled to the first auxiliary switch 60, such that, should the user move the hook, the timing circuit will close the third auxiliary switch 70. Accordingly, in order to put the chainsaw back into the active state, all a user need to do is move the hook from the folded-in position to the protruding position and back again.

Whilst not shown, in this embodiment a further light emitting diode would be provided in the indication circuit, this time to show whether the timer had "timed out". The user would then know that the chainsaw was inactive because it had not been used for a period, and so they would need to take the above-mentioned action in order to reactivate it.

Alternatively, the third auxiliary switch 70 may be directly engagable by a user; for example, if the device is dormant, then by manipulating the power switch 20 of FIG. 1, off and on again, a user can reactivate the device.

The invention claimed is:

1. A battery-powered portable tool, comprising:
   a housing,
   a driven element supported by the housing,
   an electric motor coupled to the driven element to selectively drive the driven element,
   a battery providing a power source for the electric motor when selectively coupled to the electric motor, and
   a control circuit configured to enable selective coupling of the battery to the electric motor,
   wherein the control circuit comprises at least a main switch and a first auxiliary switch, the main switch being operable to provide the selective coupling of the battery to the electric motor based at least in part on a position of the first auxiliary switch, and
   wherein the first auxiliary switch is operable based on a position of a protruding member having a folded-in position and a protruding position relative to the housing, the first auxiliary switch enabling the main switch to selectively couple the battery to the electric motor responsive to the protruding member being in the folded-in position and preventing the main switch from selectively coupling of the battery to the electric motor responsive to the protruding member being in the protruding position.

2. The tool of claim 1, wherein the control circuit further comprises a second auxiliary switch that is operable based on a position of a chain brake handle of the tool, the second auxiliary switch enabling the main switch to selectively couple the battery to the electric motor responsive to the first auxiliary switch being closed and the chain brake handle being reset.

3. The tool of claim 1, wherein an indication circuit is coupled to the control circuit to indicate an operational state of the tool based at least in part on a position of the first auxiliary switch.

4. The tool of claim 3, wherein the indication circuit comprises a loudspeaker, and wherein the indication circuit is configured to emit an audible sound stored in a memory device through the loudspeaker to indicate the operational state of the tool.

5. The tool of claim 4, wherein the audible sound provides an audible indication of a reason for the operational state of the tool.

6. The tool of claim 4, wherein the audible sound provides an indication of the position of the protruding member.

7. The tool of claim 1, wherein the tool is a chainsaw, a hedge trimmer or handheld drill.

8. The tool of claim 1, wherein the protruding member comprises a hook.

* * * * *